Nov. 3, 1959     C. L. HALLER     2,911,514
THERMOSTATICALLY CONTROLLED COOKING APPARATUS
Filed Nov. 1, 1957
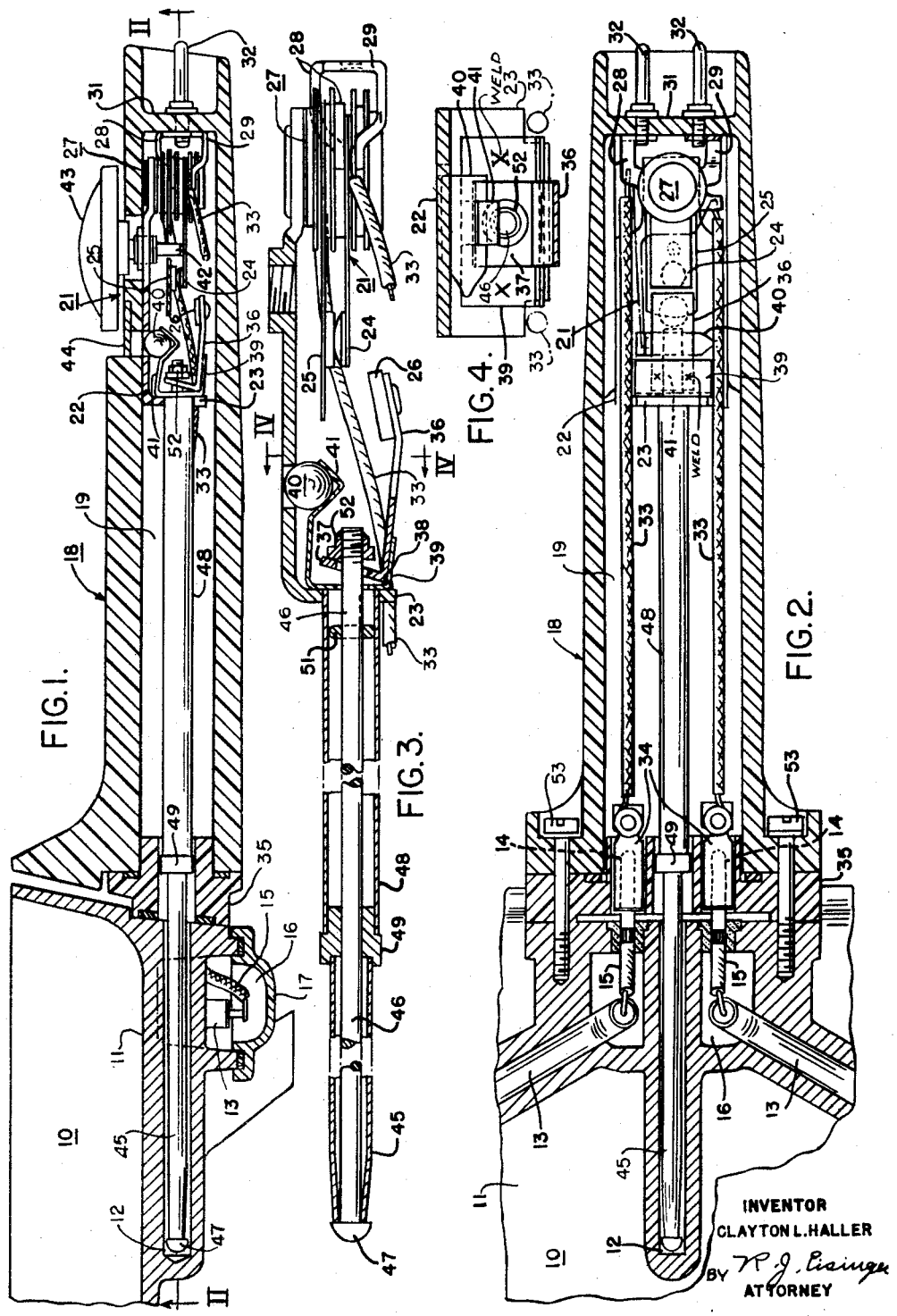
INVENTOR
CLAYTON L. HALLER
BY *N. J. Eisinger*
ATTORNEY

United States Patent Office 2,911,514
Patented Nov. 3, 1959

2,911,514

THERMOSTATICALLY CONTROLLED COOKING APPARATUS

Clayton L. Haller, Mansfield, Ohio, assignor to Westinghouse Electric Corporation, East Pittsburgh, Pa., a corporation of Pennsylvania Application November 1, 1957, Serial No. 693,976

1 Claim. (Cl. 219—44)

This invention relates to electrically heated cooking vessels having thermostatic controls of the rod and tube type and has for an object to provide improved apparatus of this kind.

A further object of the invention is to provide a rugged and compact thermostatically operated switch of the rod and tube type which may be readily built into the handle of a cooking vessel as a unit for application to the vessel.

In practicing the invention, a hollow handle having an elongated space therein, encloses a switch structure disposed in the outer end of the handle. The switch structure includes a frame secured to the handle by pin type terminals adapted for connection to an appliance cord. The opposite end of the handle is provided with female terminals for receiving pin terminals of the heater associated with the pan or vessel, which pin terminals extend from the side of the vessel. The terminals of the handle are serially connected with the switch structure for the control of the heater of the vessel. A rod and tube thermostat is arranged in the space and has a tube of relatively high expansive metal extending from the handle into a well formed in the vessel. A rod of low expansive metal is secured to the tube and extends into the handle for actuation of the switch. A second tube of rigid construction is secured at one end to the frame of the switch and at its other end to the high expansive tube for properly positioning the latter. The switch frame, the rod and tube thermostat and the rigid tube may be assembled as a unit, adjusted and tested and then assembled in the handle. This assembly may then be attached to the vessel without further calibration or adjustment.

The foregoing and other objects are effected by the invention as will be apparent from the following description and claim taken in connection with the accompanying drawings, forming a part of this application, in which:

Fig. 1 is a vertical section taken longitudinally through the handle of a cooking vessel constructed and arranged in accordance with the invention, Fig. 2 is a section taken along the line II—II of Fig. 1, Fig. 3 is a vertical section taken through the switch and thermostat assembly shown in Fig. 1, and Fig. 4 is a section taken along the line IV—IV of Fig. 3.

Referring now to the drawing, the invention is disclosed applied to a cooking vessel such as, for example, an electrically heated skillet 10 having a bottom wall 11 recessed, as shown at 12, to form a well for the reception of a rod and tube thermostat to be referred to in detail hereinafter. The vessel 10 is electrically heated in any suitable manner such as, for example, by means of a sheathed heater 13 of conventional construction and cast in the wall 11 of the vessel 10. The heater is suitably connected to pin type terminals, shown at 14 in Fig. 2, extending outwardly of the vessel 10 on opposite sides of the well 12. The terminals 14 are suitably insulated from the vessel 10 and are connected to the ends of the heater by conductors 15 within a chamber 16 formed in the vessel 10 and closed by a gasketed cover 17 (see Fig. 1).

The handle for the skillet is of the so-called "stick" type and is shown at 18 enclosing an elongated space 19 aligned substantially with the well 12. A thermostatically operated switch structure, generally indicated at 21, is disposed in the outer region of the space 19 adjacent the end of the handle 18; which switch structure includes a rigid frame 22 having a wall 23 disposed transversely of the space 19 and vertically arranged in the normal operating position of the cooking vessel. The switch structure 21 includes resilient contact leaves 24 and 25, the latter of which is engageable by an insulating button 26 to be referred to hereinafter. The resilient contact leaves are supported in a conventional stack 27 which also includes relatively rigid terminal members 28 and 29; the latter being drawn tightly into engagement with an insulating wall 31 formed in the handle 18, by means of pin type terminals 32. These pin terminals 32 extend through the wall 31 and are threaded in the terminal members 28 and 29 to form the primary support for the switch structure 21. It is to be understood that the terminals 32 are also attachable to the receptacle of a conventional appliance cord for energization. The switch contacts 24 and 25 are connected in series with the heater 13 for controlling energization thereof, as is well understood. The switch structure 21 is connected to the heater 13 by means of conductors 33 which terminate in female terminals 34 suitably mounted in an insulating spacer 35 and receiving the pin type terminals 14 of the heater.

The contacts 24 and 25 are biased into engagement at all times and are separated by engagement of the button 26 with the upper resiliently mounted contact 25. In accordance with the invention, the button 26 is carried on a bell crank having a relatively long leg 36 and a shorter leg 37 and a fulcrum 38 is formed at the junction of the legs 36 and 37. The bell crank is mounted so that the fulcrum 38 is maintained in close proximity to the wall 23 by means of a spring hinge structure 39. The hinge 39 is welded or otherwise secured to the leg 36 and extends around the fulcrum 38 and upwardly along the wall 23 to which it is secured, preferably, by welding. A cradle for a pilot light, shown at 40, may be provided by extending the spring hinge 39 forwardly from the wall 23 as shown at 41. It will be understood that the bell crank is moved about its fulcrum 38 in counterclockwise direction for engaging the button 26 and resilient contact 25 to open the switch 21 and, as explained hereinafter, this is done by increasing the temperature of the vessel 10 to some predetermined value. The temperature at which the switch 21 is opened may be varied by adjusting the spacing of the contact 25 relative the button 26. As shown, a conventional screw 42 adjusts the contacts 24 and 25 relative the button 26 to vary the temperature at which the switch is actuated. The adjusting screw 42 extends exteriorly of the handle 18 and is provided with a suitable adjusting knob 43. Adjacent the knob 43, a bull's-eye or lens 44 may be arranged in a suitable opening in the handle and illuminated by the lamp 40 during periods when the heater 13 is energized.

Operation of the switch 21 is effected by a thermostat of the rod and tube type and including a tube 45 having a relatively high coefficient of expansion and a rod 46 having a lower coefficient of expansion. The tube 45 is preferably formed of aluminum and the rod 46 of a nickel iron alloy. The tube and rod are suitably secured together at their inner ends, as shown at 47. In accordance with the invention, the tube 45 terminates adjacent the outermost portion of the vessel 10 and, preferably, within the spacer 35 as shown. Accordingly, substantially all of the tube 45 is confined within the well 12 and closely follows the temperature of the wall 11 of the vessel. The outer end of the tube 45 is supported by a tubular member 48 surrounding the rod 46 and fixed, as by brazing, in an opening of the wall 23. The tubular member 48 may be formed of copper brazed steel tubing and its coefficient of expansion will usually be intermediate the coefficients of the rod 46 and the tube 45. However, this is of no great importance since the response to temperature changes in the vessel is almost entirely by the high expansive tube 45. A metal bushing 49 may be used to secure the tubular member 48 to the tube 45 and, preferably, is slidably supported in an opening in the spacer 35. It will be understood, of course, that the rod 46 is slidable in the bushing 49. The rod 46 is also slidable within a support 51 which may be provided in the tubular member 48 adjacent its connection to the wall 23. As shown in Fig. 3, the rod extends through suitable respective openings in the spring hinge 39 and the short leg 37 of the bell crank and has threads for an adjusting nut 52. The latter positions the bell crank which is biased against the nut 52 by the hinge 39, and, therefore, determines the temperature of the vessel at which the switch 21 is actuated for a given setting of the adjusting screw 42. After the nut 52 is properly set, it is fixed to the rod 46 in any suitable manner.

During heating, the rod 46 moves to the left, as viewed in the drawings, because of the expansion of the high expansive tube 45 and the nut 52 swings the bell crank counterclockwise to elevate the button 26. At a predetermined temperature determined by the adjustment of the contact leaves 24 and 25, the button engages and elevates the leaf 25 for opening the switch and de-energizing the element 13. As the tube cools, the rod 46 moves to the right for effecting clockwise movement of the bell crank and closing of the switch 21, as is understood. The temperatures at which the switch 21 is opened and closed are determined by the position of the button 26 relative the contact leaf 25 and the latter is adjusted, at will, by the control knob 43 and screw 42.

From the foregoing description, it will be apparent that the switch and thermostat structures may be constructed as a unit as shown in Fig. 3 and then tested and calibrated in a test fixture before assembly to the handle 18 and spacer 35. This handle assembly may then be attached to the vessel 10 by suitable screws 53 without further adjustment of any of the mechanism. The thermostat tube 45 and the spring terminals 34 will always be properly positioned relative the well 12 and pin contacts 14 by the spacer 35 in which they are supported. The mechanism including the bell crank for the actuation of the switch 21 employs few parts and may be economically produced. By supporting the bell crank upon the spring hinge 39 with the fulcrum 38 contiguous the wall 23, as shown, a saving in space is effected, as well as reliability in operation because of the absence of wear in any of the movable parts.

While the invention has been disclosed as applied to a permanently connected handle structure, it will be understood that it may be applied equally well to a handle structure which is readily attachable to or detachable from one appliance for use with another appliance, in accordance with well known practice.

While the invention has been shown in but one form, it will be obvious to those skilled in the art that it is not so limited, but is susceptible of various changes and modifications without departing from the spirit thereof.

What is claimed is:

In combination with a cooking pan having an electrical heating element and a recess formed in the bottom portion of the pan and terminals for said element extending from one side of the pan on opposite sides of the recess, a handle having an elongated space formed therein, means attaching the handle to the pan with the space registering with said recess, a switching mechanism disposed within said space remote from the pan and including a frame having a wall extending transversely of the space, a pair of pin terminals extending from the outer end of the handle, means within the space connecting the switching mechanism to the first-mentioned terminals for the control of the heating element, a rod and tube thermostat responsive to the temperature of the pan for actuating the switching mechanism and including a relatively high expansive tube disposed within the recess and a low expansive rod within the tube, said rod and tube having their adjacent ends within the recess secured together, means fixed to said transverse wall and said high expansive tube for supporting the thermostat within the handle, a bell crank having a short leg engaging said rod and a longer leg engageable with said switching mechanism for actuation thereof, a fulcrum formed on the bell crank adjacent the junction of said legs, and a hinge spring secured to the bell crank and said transverse wall, said spring extending around the fulcrum and having a portion thereof flush with and secured to the wall for maintaining the fulcrum in close proximity to the wall.

References Cited in the file of this patent

UNITED STATES PATENTS

| | | |
|---|---|---|
| Re. 20,570 | Bushway | Dec. 7, 1937 |
| 2,185,623 | Beam | Jan. 2, 1940 |
| 2,538,387 | Shidler | Jan. 16, 1951 |
| 2,550,188 | Darling | Apr. 24, 1951 |
| 2,744,995 | Jepson | May 8, 1956 |

FOREIGN PATENTS

| | | |
|---|---|---|
| 1,033,094 | France | Apr. 1, 1953 |
| 337,093 | Great Britain | Oct. 30, 1930 |